(12) United States Patent
Itasaka et al.

(10) Patent No.: US 11,271,504 B2
(45) Date of Patent: Mar. 8, 2022

(54) MOTOR CONTROL SYSTEM

(71) Applicant: Mazda Motor Corporation, Hiroshima (JP)

(72) Inventors: Naoki Itasaka, Aki-gun (JP); Hisayuki Kabashima, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/936,455

(22) Filed: Jul. 23, 2020

(65) Prior Publication Data

US 2021/0036641 A1 Feb. 4, 2021

(30) Foreign Application Priority Data

Jul. 31, 2019 (JP) .............................. JP2019-141549

(51) Int. Cl.
| | |
|---|---|
| *H02P 1/00* | (2006.01) |
| *H02P 21/22* | (2016.01) |
| *B60L 15/20* | (2006.01) |
| *H02P 27/12* | (2006.01) |

(52) U.S. Cl.
CPC .............. *H02P 21/22* (2016.02); *B60L 15/20* (2013.01); *H02P 27/12* (2013.01); *B60W 2540/10* (2013.01)

(58) Field of Classification Search
CPC .......... H02P 21/22; H02P 27/12; B60L 15/20; B60W 2540/10; G05B 1/00; G05B 9/00
See application file for complete search history.

(56) References Cited

FOREIGN PATENT DOCUMENTS

| | | | | |
|---|---|---|---|---|
| JP | 2011-200545 A | 10/2011 | | |
| JP | 2014-231290 A | 12/2014 | | |
| JP | 2016000537 A | * 1/2016 | | |
| WO | WO-2014188871 A1 | * 11/2014 | .......... | B60L 15/2054 |

* cited by examiner

*Primary Examiner* — Karen Masih
(74) *Attorney, Agent, or Firm* — Xsensus LLP (57) ABSTRACT

A motor control system configured to be mounted to a movable object that moves by using a drive motor, the motor control system comprising: a sensor configured to detect an output requested to drive the movable object; a battery configured to supply electric power to the drive motor; and circuitry configured to control the drive motor such that a requested amount of rotary power of the drive motor is output in a specified output range, the requested amount of the rotary power of the drive motor being set on the basis of a detection value of the output sensor.

18 Claims, 8 Drawing Sheets

MOTOR CONTROL SYSTEM

CROSS-REFERENCE TO RELATED APPLICATION

The present application claims priority to JP 2019-141549, filed Jul. 31, 2019, the entire contents of which are incorporated herein by reference.

TECHNICAL FIELD

The disclosed technique relates to a motor control system mounted on a movable object that moves by using a drive motor.

BACKGROUND ART

A motor is a device (an electric motor) that converts electrical energy into kinetic energy. The motor can easily be controlled, and thus is used in various fields such as a field of home appliances. In general, many motors are small-sized and produce low output. Meanwhile, relatively large-sized, high-output motors (drive motors) for driving a train, an elevator, and the like are also available. In a power plant and the like, the motor is also used as a generator.

In recent years, use of the drive motors for electric vehicles, hybrid vehicles, and the like has been increased. For example, in JP-A-2014-231290 (Patent document 1), a hybrid vehicle on which such a drive motor (also used as the generator) and an engine are mounted is disclosed. The hybrid vehicle includes, as an electric power supply of the drive motor, a high-power battery, a rated voltage of which is several hundred V, and which can be connected to a charging stand or a household electric power supply for charging.

In relation to the disclosed technique, a motor that is used for a washing machine and in which a magnetic force of a magnet can be increased or reduced is disclosed in JP-A-2011-200545 (Patent document 2).

High-torque, low-speed motor output is requested in a washing and rinsing process of the washing machine, and low-torque, high-speed motor output thereof is requested in a dewatering process. For this reason, the washing machine includes a transmission, and the transmission switches the motor output between two stages according to both of these processes. In the washing machine disclosed in Patent document 2, each of the motor output switched by the transmission is optimized according to a load by increasing or reducing the magnetic force of the magnet from the normal magnetic force and thereby changing an output characteristic of the motor.

SUMMARY

As described above, high-frequency output that is requested for the motor of the washing machine is limited to two output ranges. Thus, the motor output can be optimized when being switched to either one thereof by the transmission and by magnetizing or demagnetizing the magnet according to an amount of the load in each of the output ranges with the normal magnetic force being a reference.

Meanwhile, the high-frequency output in an extremely wide range in both of a load direction and a rotational direction is requested for the drive motor that is mounted on an automobile or the like. In addition, because the automobile or the like itself moves, only the battery can be used as the electric power supply thereof.

In order to realize the wide-ranging output characteristic of the drive motor under such restriction, it is considered to mount a high-voltage battery as mounted on the hybrid vehicle disclosed in Patent document 1 or to mount a large-sized motor. However, as recognized by the present inventor, in either case, equipment becomes large and heavy, which is disadvantageous for a movable object.

In view of the above, an object of the disclosed technique is to provide a motor control system that can avoid generation of a high voltage by a battery and enlargement of a motor and that is suitable for a drive motor of a movable object that itself moves.

The disclosed technique relates to a motor control system mounted on a movable object that moves by using a drive motor.

The motor control system includes: a sensor for detecting output that is requested to drive the movable object; a battery for supplying electric power to the drive motor; and circuitry configured to control the drive motor such that a requested amount of rotary power of the drive motor is output in a specified output range, the requested amount of the rotary power of the drive motor being set on the basis of a detection value of the output sensor.

The drive motor has: a rotor which outputs the rotary power and in which a magnetic force variable magnet is installed; and a stator which opposes the rotor with a gap being interposed therebetween and in which plural coils energized by the battery are installed. The circuitry is configured to: control a drive current flowing through the coil to cause the requested amount of the rotary power to be output; and control a magnetizing current flowing through the coil to change a magnetic force of the magnetic force variable magnet. The circuitry is configured to change the magnetic force of the magnetic force variable magnet such that the magnetic force of the magnetic force variable magnet substantially matches an electromagnetic force that is generated in the coil by the drive current.

That is, this motor control system is a system that controls the drive motor mounted on the movable object, and moves together with the movable object. Accordingly, as an electric power supply, the battery that can be mounted on the movable object is used. The drive motor is a so-called synchronous motor of a permanent magnet type. In the stator, the plural coils, each of which generates the electromagnetic force, are installed. In the rotor, the plural magnets are installed.

However, in this motor control system, the magnetic force variable magnet is used as each of the magnets, and the magnetic force thereof can vary.

The circuitry is configured to change the magnetic force of the magnetic force variable magnet such that the magnetic force of the magnetic force variable magnet substantially matches the electromagnetic force generated in the coil.

When the magnetic force of the magnetic force variable magnet substantially matches the electromagnetic force generated in the coil, a power factor becomes about 1, and the power factor can be increased to a maximum level. A detailed description will be made later. When the power factor is increased, the drive motor can be made lightweight and compact, and can produce the appropriate output in the wide output range. Therefore, it is possible to avoid generation of a high voltage by the battery and enlargement of the motor and to realize the motor control system suitable for the drive motor of the movable object that itself moves.

Furthermore, in the motor control system, a base magnetic force serving as a reference of the magnetic force variable magnet is set to such a magnetic force that substantially matches the electromagnetic force generated in an upper limit load region of the output range.

Thus, the power factor becomes about 1 even with a high load. As a result, the drive motor can efficiently be driven. It is possible to suppress insufficient output of the drive motor, which is lightweight and compact, and thus stable movement can be achieved. In addition, with a middle load and a low load, with which the electromagnetic force becomes low, the magnetic force of the magnetic force variable magnet is reduced according to the electromagnetic force. In this way, the power factor can become about 1. Thus, the power factor can be increased in the substantially entire region of the output range, and the drive motor can efficiently be driven.

In the motor control system, in the case where the requested amount of the rotary power becomes equal to or lower than a specified value that does not contribute to movement of the movable object, the magnetic force of the magnetic force variable magnet may be reset to the base magnetic force.

There is a case where the movable object rapidly accelerates at once. The base magnetic force is set to a high base magnetic force that corresponds to the high load. Thus, even when such rapid acceleration occurs, the drive motor can appropriately be driven by resetting the magnetic force of the magnetic force variable magnet to the base magnetic force in an idle operation state.

In the motor control system, the output range may be divided into plural magnetization regions, and the magnetization control section may change the magnetic force of the magnetic force variable magnet according to each of the magnetization regions.

In this way, processing to change the magnetic force of the magnetic force variable magnet can efficiently be executed at an appropriate frequency. Thus, a processing load can be reduced.

In the motor control system, the movable object may be an automobile. From a perspective of a requested motor characteristic, the motor control system is suitable for control of the drive motor of the automobile. In such a case, the output sensor may be an accelerator sensor that detects an accelerator pedal position. Furthermore, in such a case, the automobile may further include an engine, the drive motor and the engine may be configured to drive the automobile cooperatively on the basis of a detection value of the accelerator sensor, and a rated voltage of the battery may be equal to or lower than 50 V.

In a so-called hybrid vehicle, the drive motor is driven in cooperation with the engine. Thus, by combining both of the output, the hybrid vehicle can further favorably be driven. In the case where the rated voltage of the battery is equal to or lower than 50 V, an advanced insulation measure does not have to be taken, which reduces cost and weight and is useful for improvement in fuel economy.

According to the disclosed technique, the generation of the high voltage by the battery and the enlargement of the motor can be avoided. Therefore, the battery and the drive motor can be made compact, and the motor control system suitable for the movable object can be realized.

DETAILED DESCRIPTION

A description will hereinafter be made on an embodiment of the disclosed technique with reference to the drawings. The following description is essentially and merely illustrative and thus has no intention to limit the present invention, application subjects thereof, and application thereof.

<Movable Object>

Figure 1:
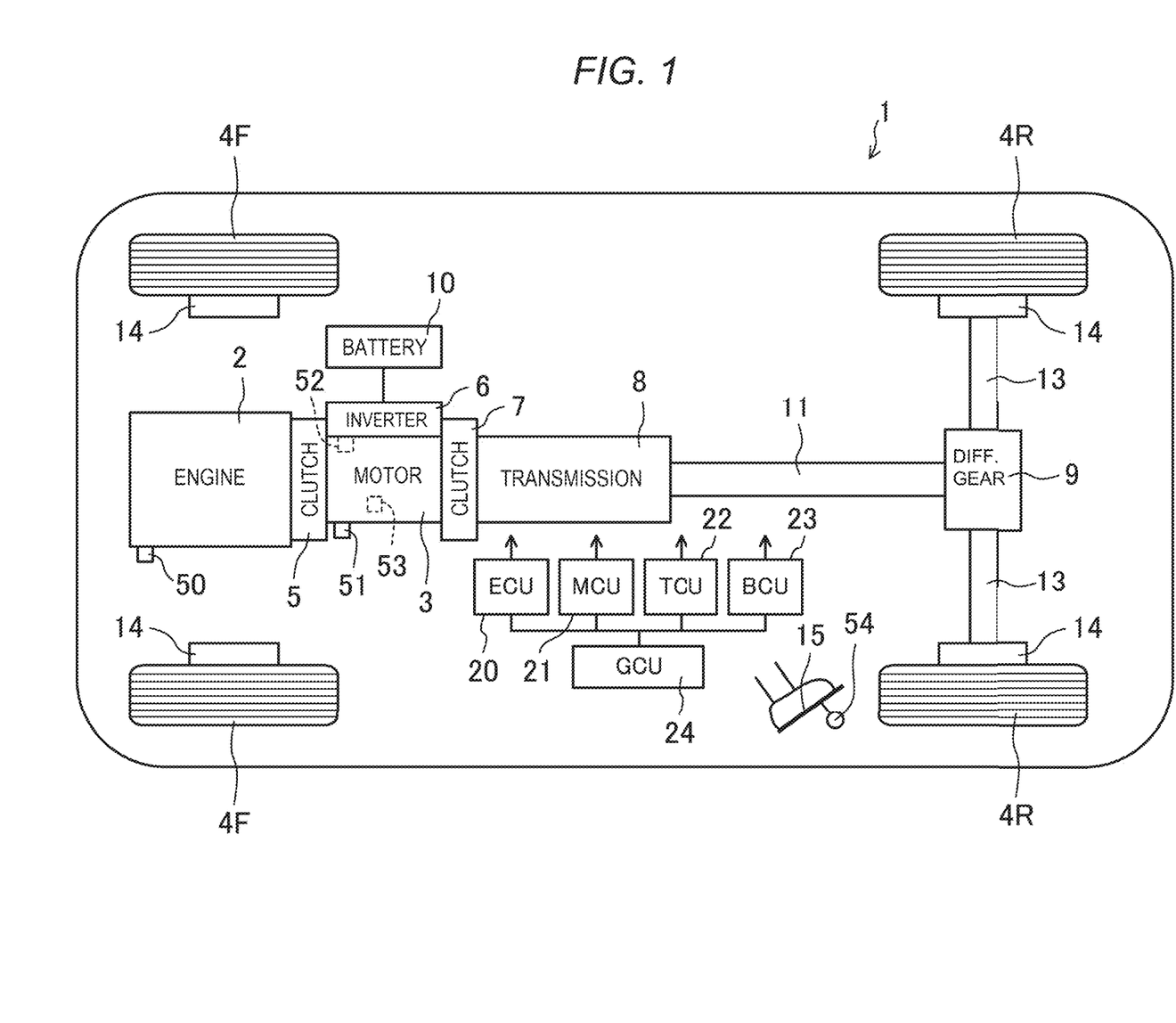
FIG. 1 is a schematic view of a main configuration of an automobile to which the disclosed technique is applied.

FIG. 1 illustrates a four-wheeled automobile 1 (an example of the movable object) to which the disclosed technique is applied. This automobile 1 is a hybrid vehicle. An engine 2 and a drive motor 3 are mounted as drive sources of the automobile 1. These cooperatively drive, of four wheels 4F, 4F, 4R, 4R, two wheels (drive wheels 4R) that are located in a bilaterally-symmetrical manner. In this way, the automobile 1 moves (travels).

In a case of this automobile 1, the engine 2 is arranged in a front portion of a body, and the drive wheels 4R are arranged in a rear portion of the body. That is, this automobile 1 is a so-called FR vehicle. Furthermore, in the case of this automobile 1, the engine 2 serves as the main drive source when compared to the drive motor 3. The drive motor 3 is used to assist with driving of the engine 2 (a so-called mild hybrid). The drive motor 3 is not only used as the drive source but also used as a generator during regeneration.

The automobile 1 includes, as devices for a drive system, a first clutch 5, an inverter 6, a second clutch 7, a transmission 8, a differential gear 9, a battery 10, and the like in addition to the engine 2 and the drive motor 3. In addition, the automobile 1 includes, as devices for a control system, an engine control unit (ECU) 20, a motor control unit (MCU) 21, a transmission control unit (TCU) 22, a brake control unit (BCU) 23, a general control unit (GCU) 24, and the like.

An engine speed sensor 50, a motor rotation sensor 51, a current sensor 52, a magnetic force sensor 53, an accelerator sensor 54, and the like are also installed in the automobile 1 in association with the devices for the control system. The accelerator sensor 54, the battery 10, and the MCU 21 constitute a motor control system.

(Devices for Drive System)

The engine 2 is an internal combustion engine that burns gasoline as fuel, for example. In addition, the engine 2 is a so-called four-stroke engine that generates rotary power by repeating each of cycles including intake, compression, combustion, and exhaust. Various types and configurations of the engine 2, such as a diesel engine, are available, and the type and the configuration of the engine are not particularly limited in the disclosed technique.

In this automobile 1, the engine 2 is arranged in a substantially central portion in a vehicle width direction in a state where an output shaft for outputting the rotary power is pointed in a longitudinal direction of the body. In the automobile 1, various devices and mechanisms associated with the engine 2, such as an intake system, an exhaust system, and a fuel supply system, are installed. However, these will neither be illustrated nor described.

Figure 2:
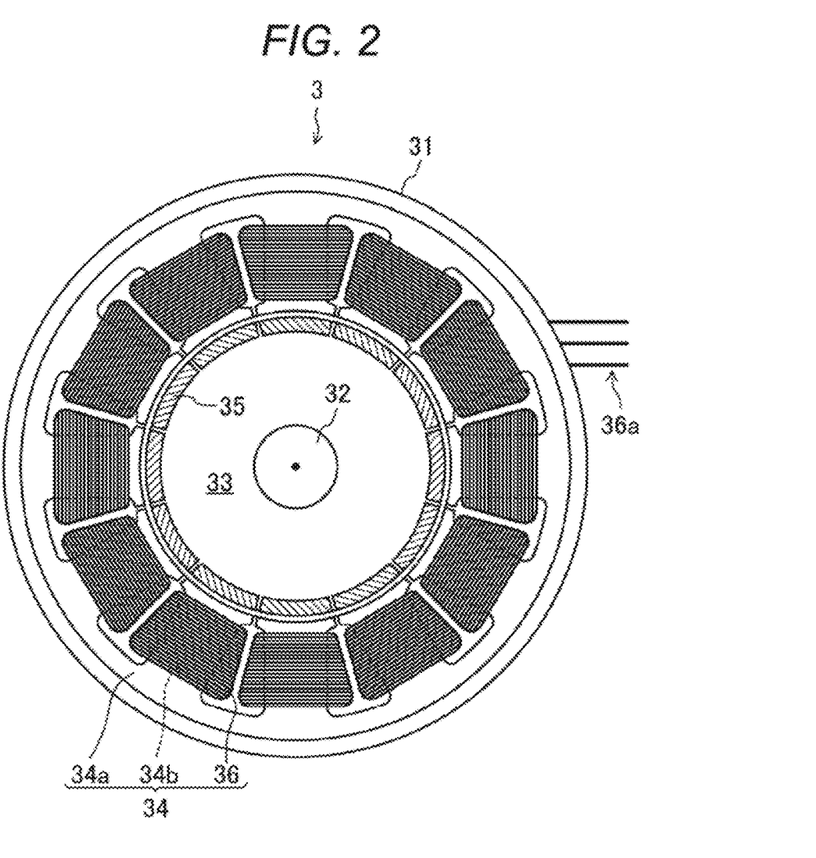
FIG. 2 is a schematic cross-sectional view of a configuration of a drive motor.

The drive motor 3 is arranged behind the engine 2 in series therewith via the first clutch 5. The drive motor 3 is a synchronous motor of a permanent magnet type that is driven by a three-phase AC. As illustrated in FIG. 2, the drive motor 3 is generally configured to include a motor case 31, a shaft 32, a rotor 33, a stator 34, and the like.

The motor case 31 is formed as a container which has a cylindrical space therein and a front end surface and a rear end surface of which are sealed, and is fixed to the body of the automobile 1. The rotor 33 and the stator 34 are accommodated in the motor case 31. The shaft 32 is supported by the motor case 31 in a freely rotatable manner in a state where each of a front end portion and a rear end portion thereof is projected from the motor case 31.

The first clutch 5 is installed in a manner to be interposed between the front end portion of the shaft 32 and the output shaft of the engine 2. The first clutch 5 is configured to be switchable between a state where the output shaft and the shaft 32 are coupled (an engaged state) and a state where the output shaft and the shaft 32 are decoupled from each other (a disengaged state).

The second clutch 7 is installed in a manner to be interposed between the rear end portion of the shaft 32 and an input shaft of the transmission 8. The second clutch 7 is configured to be switchable between a state where the shaft 32 and the input shaft of the transmission 8 are coupled (an engaged state) and a state where the shaft 32 and the input shaft of the transmission 8 are decoupled from each other (a disengaged state).

The rotor 33 is formed of a columnar member that is configured by stacking plural metal plates, each of which has a shaft hole at a center. An intermediate portion of the shaft 32 is fixed to the shaft hole of the rotor 33. In this way, the rotor 33 and the shaft 32 are integrated with each other.

A magnet 35 is installed for an entire circumference of an outer circumferential portion of the rotor 33. The magnet 35 is configured such that an S pole and an N pole are alternately arranged at equally-spaced intervals in a circumferential direction. The magnet 35 may be constructed of one cylindrical magnet having plural magnetic poles or may be constructed of plural arc-like magnets, each of which constitutes the respective magnetic pole.

In this drive motor 3, the magnet 35 is further configured to be able to vary a magnitude of a magnetic force (the magnetic force variable magnet 35). Usually, a magnet (a permanent magnet) having a high coercive force (coercivity) and capable of keeping the magnetic force for a long period is used for this type of the drive motor 3. In this drive motor 3, a permanent magnet having a low keeping force is used as the magnetic force variable magnet so that the magnetic force can be changed relatively easily.

Various types of the permanent magnets such as a ferrite magnet, a neodymium magnet, a samarium-cobalt magnet, and an alnico magnet are available, and the keeping forces thereof vary. The type of and a material for the magnetic force variable magnet 35 can be selected according to a specification and are not particularly limited.

In this automobile 1, the motor control system is configured that the drive motor 3 can be lightweight and compact by using this magnetic force variable magnet 35. A detailed description on the motor control system will be made later.

The cylindrical stator 34 is installed around the rotor 33 with a slight clearance (gap) being provided therebetween (an inner rotor type). The stator 34 has: a stator core 34a that is configured by stacking plural metal plates; and plural coils 36, each of which is configured by winding an electrical wire around the stator core 34a.

The stator core 34a is provided with plural teeth 34b, each of which radially bulges inward, and the plural coils 36 are formed by winding the electrical wire around each of these teeth 34b in a specified order. These coils 36 constitute a three-phase coil group that includes a U-phase, a V-phase, and a W-phase. In order to energize these coils 36, three connection cables 36a, 36a, 36a are led out of the motor case 31 from these coils 36.

These connection cables 36a, 36a, 36a are connected to the in-vehicle battery 10 via the inverter 6. In the case of this automobile 1, as the battery 10, a DC battery 10 having a rated voltage that is equal to or lower than 50 V, more specifically, 48 V is used.

Thus, the battery 10 itself can be made lightweight and compact without necessity of generating the high voltage unlike that in the hybrid vehicle disclosed in above-described Patent document 1. In addition, because an advanced countermeasure against electrical shock is unnecessary, an insulating member and the like can be simplified, and the battery 10 can further be made lightweight and compact. Therefore, vehicle weight of the automobile 1 can be suppressed, and thus fuel consumption and electric power consumption can be suppressed.

The battery 10 supplies DC power to the inverter 6. The inverter 6 converts the DC power into the three-phase AC and energizes the drive motor 3. In this way, an electromagnetic force is generated in each of the coils 36. Due to an attractive force and a repulsive force that act between the electromagnetic force and the magnetic force of the magnetic force variable magnet 35, the rotor 33 is rotationally driven, and rotary power thereof is output to the transmission 8 via the shaft 32 and the second clutch 7.

In the case of this automobile 1, the transmission 8 is a multistage automatic transmission (a so-called AT). The transmission 8 has the input shaft at one end, and has an output shaft at the other end. Gear shift mechanisms such as plural planetary gear mechanisms, a clutch, a brake, and the like are embedded between these input shaft and output shaft.

It is configured that, when one of these gear shift mechanisms is switched to the other, switching between forward travel and reverse travel is achieved, and a rotational speed can be changed between input and output of the transmission 8. The output shaft of the transmission 8 is coupled to the differential gear 9 via a propeller shaft 11 that extends in the longitudinal direction of the body and is arranged in a coaxial manner with the output shaft.

A pair of drive shafts 13, 13, each of which extends in the vehicle width direction and is coupled to respective one of the right and left drive wheels 4R, 4R, is coupled to the differential gear 9. The rotary power that is output through the propeller shaft 11 is divided by the differential gear 9, and is thereafter transmitted to each of the drive wheels 4R through these paired drive shafts 13, 13. A brake 14 is attached to each of the wheels 4F, 4F, 4R, 4R so as to brake rotation thereof.

(Devices for Control System)

In the automobile 1, in order to control the travel thereof according to a driver's operation, units including the ECU 20, the MCU 21, the TCU 22, the BCU 23, and the GCU 24, which are described above, are installed. Each of these units is constructed of hardware such as a CPU, memory, and an interface as well as software such as a database and a control program.

The ECU 20 is a unit that primarily controls actuation of the engine 2. The MCU 21 is a unit that primarily controls actuation of the drive motor 3 (corresponding to a control unit). The TCU 22 is a unit that primarily controls actuation of the transmission 8. The BCU 23 is a unit that primarily controls actuation of the brakes 14. The GCU 24 is a higher unit that is electrically connected to these ECU 20, MCU 21, TCU 22, and BCU 23 and comprehensively controls these.

The engine speed sensor 50 is attached to the engine 2, detects a speed of the engine 2, and outputs the speed of the engine 2 to the ECU 20. The motor rotation sensor 51 is attached to the drive motor 3, detects a rotational speed and a rotational position of the drive motor 3, and outputs the rotational speed and the rotational position of the drive motor 3 to the MCU 21. The current sensor 52 is attached to the connection cables 36a, detects a current value applied to each of the coils 36, and outputs the current value to the MCU 21.

The magnetic force sensor 53 is attached to the drive motor 3, detects the magnetic force of the magnetic force variable magnet 35, and outputs the magnetic force of the magnetic force variable magnet 35 to the MCU 21. The accelerator sensor 54 is attached to a pedal of an accelerator (an accelerator pedal 15) that the driver depresses when driving the automobile 1, detects an accelerator pedal position that corresponds to requested output for driving of the automobile 1, and outputs the accelerator pedal position to the ECU 20 (corresponding to an output sensor).

The automobile 1 travels when the units cooperatively control each of the devices for the drive system on the basis of signals of detection values input from these sensors. For example, when the automobile 1 travels by using drive power of the engine 2, the ECU 20 controls operation of the engine 2 on the basis of the detection values of the accelerator sensor 54 and the engine speed sensor 50.

The TCU 22 controls the first clutch 5 and the second clutch 7 such that the first clutch 5 and the second clutch 7 are brought into the engaged states. During braking of the automobile 1, the BCU 23 controls each of the brakes 14. During braking by the regeneration, the TCU 22 controls the first clutch 5 such that the first clutch 5 is brought into the disengaged state or a partially engaged state, and controls the second clutch 7 such that the second clutch 7 is brought into the engaged state. Then, the MCU 21 executes such control that the drive motor 3 generates the electric power and the electric power is collected into the battery 10.

<Motor Control System>

The MCU 21 executes such control that the automobile 1 travels by using the rotary power of the drive motor 3 in a state where the drive motor 3 independently produces the output or a state where the drive motor 3 assists with the output of the engine 2 when necessary.

More specifically, the ECU 20 sets the rotary power of the engine 2 on the basis of the detection values of the accelerator sensor 54, the engine speed sensor 50, and the like. In conjunction therewith, the GCU 24 sets a requested amount of the rotary power of the drive motor 3 within a specified output range according to an output distribution ratio between the engine 2 and the drive motor 3, which is set in advance. Then, the MCU 21 controls the drive motor 3 such that the requested amount is output.

Figure 3:
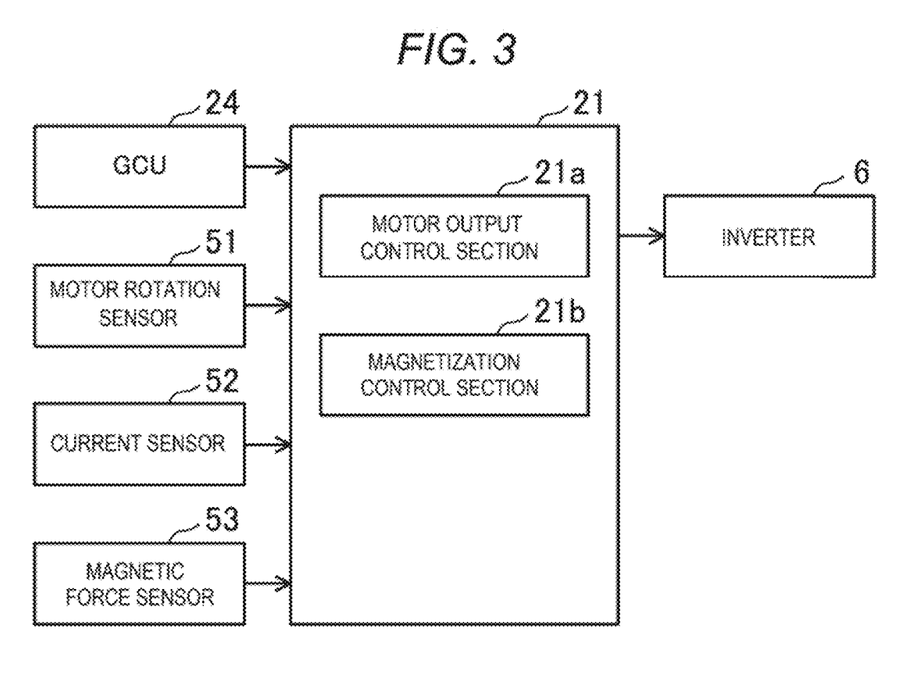
FIG. 3 is a block diagram of an MCU and main input/output devices associated therewith.

FIG. 3 illustrates the MCU 21 and main input/output devices associated therewith. The MCU 21 is provided with a motor output control section 21a and a magnetization control section 21b. The motor output control section 21a has a function of controlling driving of the drive motor 3, and controls a drive current flowing through each of the coils 36, so as to cause the drive motor 3 to output the requested amount of the rotary power.

Meanwhile, the magnetization control section 21b has a function of increasing a power factor of the drive motor 3, and controls a magnetizing current flowing through each of the coils 36, so as to change the magnetic force of the magnetic force variable magnet 35. More specifically, the magnetization control section 21b changes the magnetic force of the magnetic force variable magnet 35 such that the magnetic force of the magnetic force variable magnet 35 substantially matches the electromagnetic force generated in the coils 36 by the drive current.

The power factor is a ratio of effective power (the electric power that is actually consumed) to apparent power (the electric power that is supplied to the drive motor 3). When the power factor is low, the large current has to be applied to obtain the same amount of the output. As a result, the motor is enlarged. Thus, by increasing the power factor of the drive motor 3, the drive motor 3 can be made lightweight and compact. In addition, when the power factor is increased, an amount of the generated electric power can also be increased during the regeneration.

In order to increase the power factor of the drive motor 3 to an upper limit, the electromagnetic force generated in the coils 36 has to substantially match the magnetic force of the permanent magnet (when the electromagnetic force and the magnetic force substantially match each other, the power factor becomes about 1). In a case of the normal motor of the permanent magnet type, the magnetic force of the permanent magnet is invariable. Thus the permanent magnet having such a magnetic force is used that the power factor becomes about 1 in the most frequently-used output region of the motor.

In other words, the type, the material, a structure, and the like of the permanent magnet are designed according to the specification. In an initial state thereof at the time of shipping from a manufacturing plant, the permanent magnet is magnetized to have such a magnetic force (the magnetic force in such an initial state will also be referred to as a base magnetic force Mb).

In application of the home appliances and the like, the requested range of the motor output is relatively limited. Thus, such a motor characteristic does not cause a significant problem. However, in a case of driving the movable object such as the automobile 1, the high-frequency output in the extremely wide range is requested. Accordingly, such a motor characteristic is inconvenient in points that the battery has to generate the high voltage and the motor has to be enlarged.

To handle such a problem, in this motor control system, the magnetic force variable magnet 35 is used as the permanent magnet, and the MCU 21 is provided with the magnetization control section 21b. Thus, the power factor is improved, and such inconvenience can be eliminated.

Figure 4:
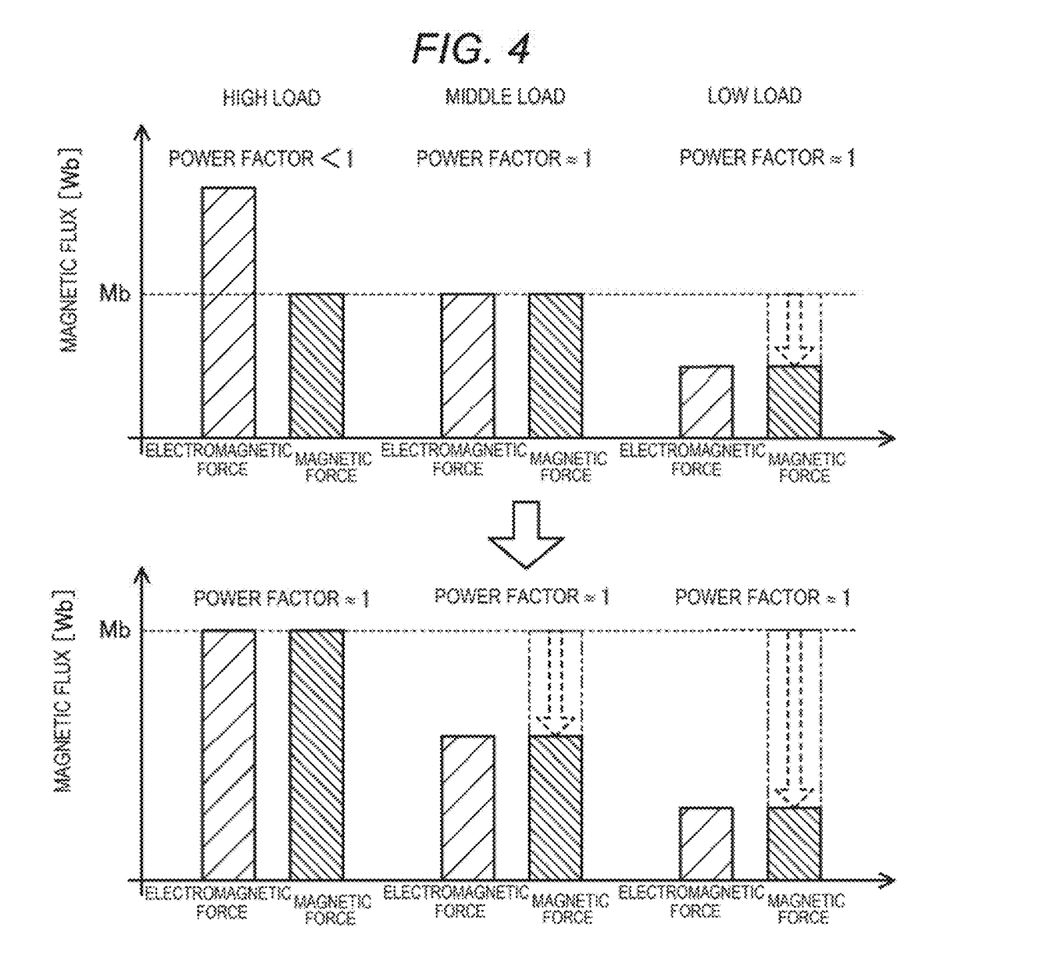
FIG. 4 includes graphs for illustrating a relationship between a magnetic force variable magnet and a power factor.

An upper graph in FIG. 4 illustrates a change in the power factor per load in the case where the normal permanent magnet type is replaced with the magnetic force variable magnet 35. In a middle load, the base magnetic force Mb is set according to the load. Thus, the power factor is about 1. With the high load, the electromagnetic force is relatively increased. Thus, the power factor is reduced (the power factor<1).

Meanwhile, with a low load, the electromagnetic force is reduced according to the load. However, by demagnetizing the magnetic force variable magnet 35 according to the electromagnetic force, the power factor can become about 1. Thus, in this case, the power factor can be increased in a region from the middle load to the low load within the motor output range.

Furthermore, the base magnetic force Mb of the magnetic force variable magnet 35 is preferably set to the magnetic force that substantially matches the electromagnetic force generated in an upper limit load region within the output range of the drive motor 3. That is, the type, the material, a structure, and the like of the magnetic force variable magnet 35 are designed according to the output of the drive motor 3 from the beginning.

Then, the magnetic force variable magnet 35 is magnetized to have such a high magnetic force that substantially matches the electromagnetic force output at an upper limit value or a value near the upper limit value of the requested load (torque) of the drive motor 3. The magnetic force variable magnet 35 that is set just as described (also referred to as the high magnetic force variable magnet 35) is installed in this drive motor 3.

A lower graph in FIG. 4 illustrates the change in the power factor per load in the case of the high magnetic force variable magnet 35. The base magnetic force Mb is set according to the substantially upper limit value of the load. Thus, the power factor with the high load is about 1. As a result, in this case, the drive motor 3 can efficiently be driven even with the high load. Thus, it is possible to suppress the insufficient output of the drive motor 3, which is lightweight and compact, and to achieve the stable travel.

With the middle load and the low load, the electromagnetic force is reduced according to the load. The high magnetic force variable magnet 35 is demagnetized according to the electromagnetic force, and thus the power factor can become about 1. Accordingly, in this case, the power factor can be increased in the substantially entire region of the motor output range, and the drive motor 3 can efficiently be driven.

Just as described, this motor control system is configured to increase the power factor of the drive motor 3. Thus, it is possible to avoid the generation of the high voltage by the battery and the enlargement of the motor.

(Output Range of Drive Motor 3)

Figure 5:
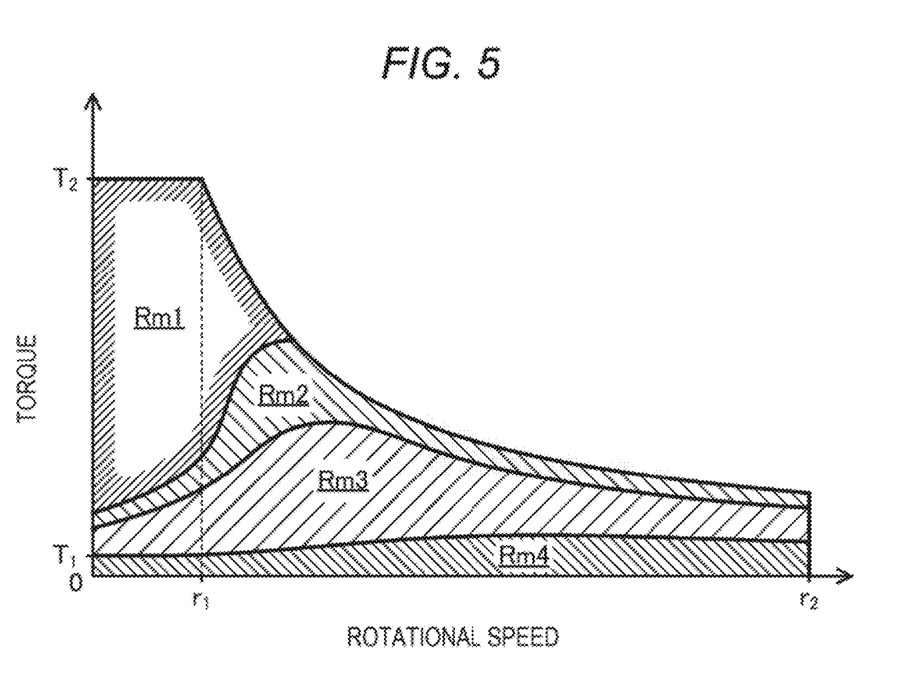
FIG. 5 is a graph that exemplifies an output range of the drive motor.

FIG. 5 exemplifies the output range of the drive motor 3. The output range is defined by an upper limit load line indicating the upper limit value of the torque (the load) by the rotational speed.

More specifically, in a low speed region up to a specified rotational speed (r1), the upper limit value of the torque is kept at the maximum (T2). In a middle speed region and a high speed region where the rotational speed is higher than that in the low speed region, the upper limit value of the torque is gradually reduced until the rotational speed reaches an upper limit value (r2).

In the MCU 21, data such as a map and a table defining such an output range is set in advance. The motor output control section 21a refers to the data and thereby controls the drive motor 3 within the output range.

Furthermore, in this motor control system, the output range of the drive motor 3 is divided into plural magnetization regions. The magnetization control section 21b is configured to change the magnetic force of the high magnetic force variable magnet 35 according to each of these magnetization regions.

As illustrated in FIG. 5, in this embodiment, the output range of the drive motor 3 is divided into four of first to fourth magnetization regions Rm. More specifically, the output range of the drive motor 3 is divided into: a first magnetization region Rm1 with the high load that is located on the low speed side and includes the maximum value T2 of the torque; a second magnetization region Rm2 that is stretched from the low speed side to the high speed side and in which the torque peaks at intermediate rotation with the lower load than that in the first magnetization region Rm1; a third magnetization region Rm3 with the lower load than that in the second magnetization region Rm2 and in which the peak of the torque is shifted to the high speed side; and a fourth magnetization region Rm4 with the lower load than that in the third magnetization region Rm3 and including torque (torque that does not contribute to the travel of the automobile 1) T1 in which the drive motor 3 idles.

In each of the magnetization regions Rm, an optimized magnetic force value (an optimum magnetic force value) with which the high power factor can be obtained is set in a manner to correspond to the output therein. For example, in the first magnetization region Rm1, the base magnetic force Mb is set to the optimum magnetic force value (a first optimum magnetic force value). In the second magnetization region Rm2, the lower optimum magnetic force value than the first optimum magnetic force value is set (a second optimum magnetic force value). In the third magnetization region Rm3, a third optimum magnetic force value that is lower than the second optimum magnetic force value is set. In the fourth magnetization region Rm4, a fourth optimum magnetic force value that is lower than the third optimum magnetic force value is set.

The magnetization control section 21b predicts the optimum magnetization region Rm on the basis of an operation state of the automobile 1. In the case where the magnetization region Rm is shifted to the adjacent magnetization region Rm, the magnetization control section 21b changes the magnetic force of the high magnetic force variable magnet 35 to the optimum magnetic force value that corresponds to the magnetization region Rm. For example, in the case of shifting from the first magnetization region Rm1 to the second magnetization region Rm2, demagnetizing processing is executed in the drive motor 3, and the magnetic force of the high magnetic force variable magnet 35 is changed from the first optimum magnetic force value to the second optimum magnetic force value.

In addition, for example, in the case of shifting from the third magnetization region Rm3 to the second magnetization region Rm2, magnetizing processing is executed in the drive motor 3, and the magnetic force of the high magnetic force variable magnet 35 is changed from the third optimum magnetic force value to the second optimum magnetic force value.

(Control Example of Motor Control System)

Figure 6:
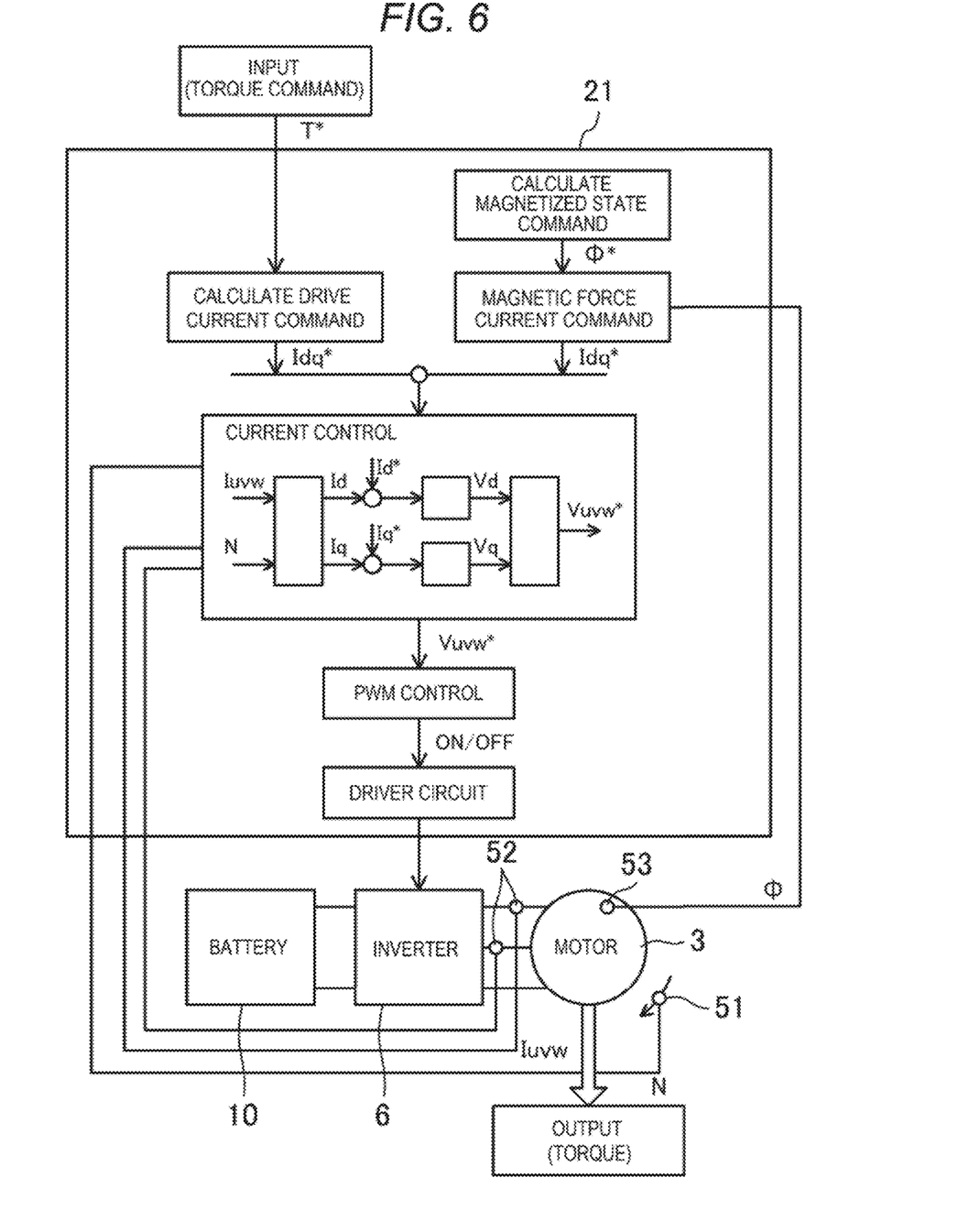
FIG. 6 is a simplified system diagram of the motor control system.
Figure 7:
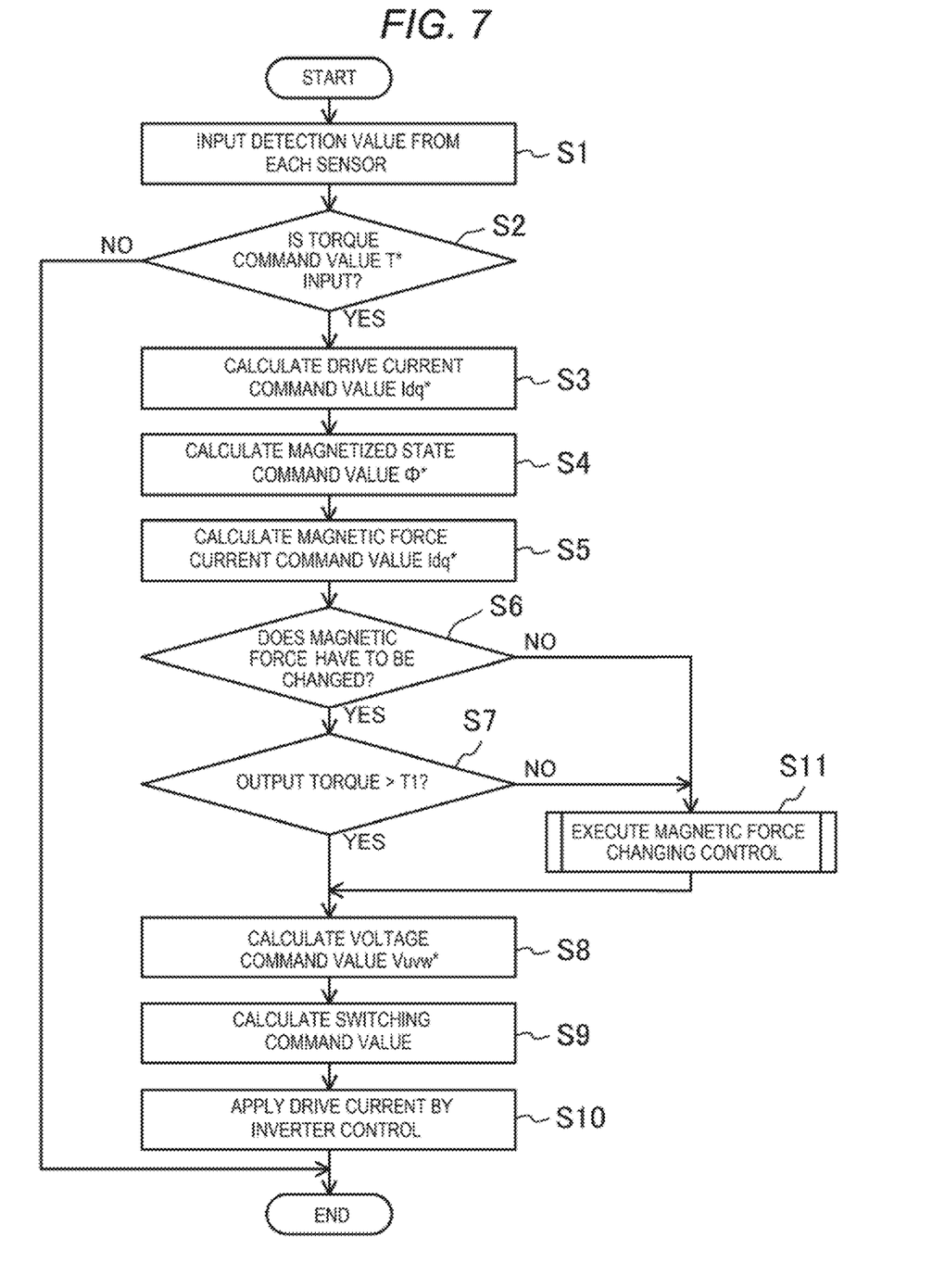
FIG. 7 is a flowchart illustrating an example of control of the drive motor that is executed by the MCU.

FIG. 6 is a simplified system diagram of the motor control system. FIG. 7 illustrates an example of control of the drive motor 3 that is executed by the MCU 21. A description will be made on a specific flow of the control of the drive motor 3. The drive motor 3 is controlled by vector control that uses a torque current command Iq* and an excitation current command Id*.

When the automobile 1 is brought into a state capable of traveling, the detection values from the current sensor 52, the motor rotation sensor 51, and the magnetic force sensor 53 are constantly input to the MCU 21 (step S1). Similarly, the detection values from the accelerator sensor 54 and the engine speed sensor 50 are constantly input to the ECU 20.

The GCU 24 acquires the detection value of the accelerator sensor 54 from the ECU 20, and sets the requested amount of the rotary power of the drive motor 3 according to the output distribution ratio between the engine 2 and the drive motor 3, which is set in advance. The GCU 24 outputs a command (a torque command value T*) to output the torque corresponding to the requested amount to the MCU 21.

When the torque command value T* is input (Yes in step S2), the MCU 21 (the motor output control section 21a) executes calculation processing of a command (a drive current command value Idq*) to output a variation in the drive current (a torque current component) for generating the torque (step S3). In addition, the MCU 21 (the magnetization control section 21b) executes calculation processing of a command (a magnetized state command value Φ*) to output the optimum magnetic force value that corresponds to the appropriate magnetization region Rm (step S4). On the basis of the magnetized state command value Φ*, the magnetization control section 21b executes calculation processing of a command (a magnetic force current command value Idq*) to output the torque current component that corresponds to a variation in the magnetic force of the high magnetic force variable magnet 35 (step S5).

The MCU 21 determines whether the magnetic force of the high magnetic force variable magnet 35 has to be changed on the basis of the calculated drive current command value Idq* and the calculated magnetic force current command value Idq* (step S6). For example, as described above, in the case where the magnetization region Rm is shifted to another magnetization region Rm when the requested torque is output, the MCU 21 determines that the magnetic force of the high magnetic force variable magnet 35 has to be changed. In the case where the magnetization region Rm remains to be the same when the requested torque is output, the MCU 21 determines that the magnetic force of the high magnetic force variable magnet 35 does not have to be changed.

If determining that the magnetic force of the high magnetic force variable magnet 35 does not have to be changed, the MCU 21 determines whether the torque to be output is higher than the torque T1 at which the drive motor 3 idles (step S7). Then, if the torque to be output is higher than the torque T1, the MCU 21 controls the drive motor 3 by the normal vector control.

That is, in current control, the motor output control section 21a executes calculation processing of a command (a voltage command value Vuvw*) that is output for execution of PWM control on the basis of the detection values of the current sensor 52 and the motor rotation sensor 51 (step S8). Then, in the PWM control, a switching command value is calculated (step S9).

When the switching command value is output to the inverter 6 through a driver circuit, plural switching elements are subjected to on/off control in the inverter 6. As a result, the specified three-phase AC (the drive current) is applied to each of a group of the coils 36, and the drive motor 3 thereby rotates (step S10).

On the other hand, if the MCU 21 determines that the magnetic force of the high magnetic force variable magnet 35 has to be changed (No in step S6), the magnetization control section 21b executes magnetic force changing control (step S11).

In the case where the MCU 21 determines that the magnetic force of the high magnetic force variable magnet 35 does not have to be changed but the torque to be output is equal to or lower than the torque T1, at which the drive motor 3 idles (No in step S7), the magnetization control section 21b executes the magnetic force changing control (step S11).

That is, in the case where the requested amount of the rotary power of the drive motor 3 is almost 0 (zero), the magnetic force of the high magnetic force variable magnet 35 is changed and reset to the base magnetic force Mb. In the case of the automobile 1, for example, there is a case where the accelerator pedal 15 is depressed rapidly to cause rapid acceleration from an idle state or a stopped state.

In the case of the high magnetic force variable magnet 35, the base magnetic force Mb is set to the high magnetic force according to the high load. Thus, with reset to the base magnetic force Mb during idle operation, the drive motor can appropriately be driven even when such rapid acceleration occurs.

Figure 8:
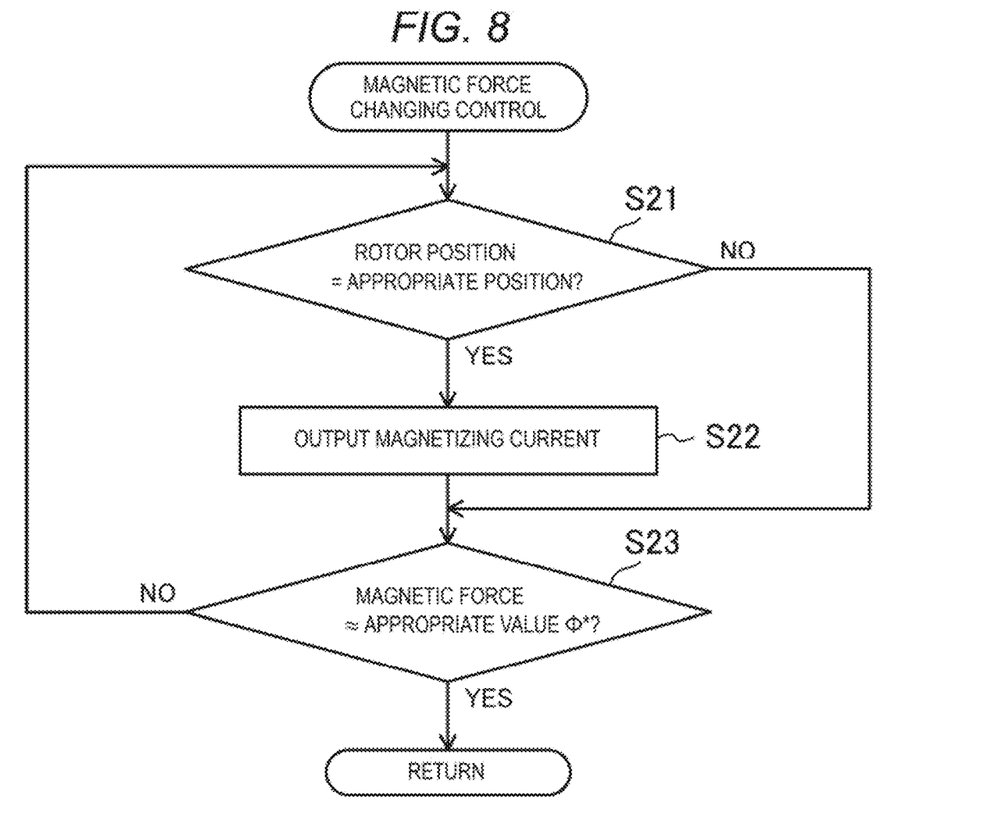
FIG. 8 is a flowchart illustrating a main processing procedure of magnetic force changing control.

FIG. 8 illustrates main processing of the magnetic force changing control. When the magnetic force changing control is requested, the magnetization control section 21b determines a direction of magnetization processing on the basis of the magnetized state command value Φ*. That is, the magnetization control section 21b determines whether to execute processing to increase the magnetic force of the high magnetic force variable magnet 35 (the magnetizing processing) or execute processing to reduce the magnetic force of the high magnetic force variable magnet 35 (the demagnetizing processing). The magnetization control section 21b further identifies the variation in the magnetic force that is increased or reduced.

Then, the magnetization control section 21b determines whether a position (a position in a rotational direction) of the rotor 33 with respect to the stator 34 is a position suited for the magnetization processing on the basis of the detection value of the motor rotation sensor 51 (step S21). Then, when the rotor 33 is located at the suited position, the magnetizing current is output (step S22). The magnetizing current is a pulsed current that generates the higher electromagnetic force than the coercive force of the high magnetic force variable magnet 35. In the magnetizing processing and the demagnetizing processing, a direction of an electromagnetic line of force is reversed from each other.

The magnetization control section 21b determines whether the magnetic force of the high magnetic force variable magnet 35 is substantially the same as the optimum magnetic force value that is instructed by the magnetized state command value Φ* (step S23), and executes the magnetization processing until the magnetic force of the high magnetic force variable magnet 35 becomes substantially the same as the optimum magnetic force value. In the case where the magnetic force of the high magnetic force variable magnet 35 is reset, the magnetization processing is executed until the magnetic force of the high magnetic force variable magnet 35 becomes substantially the same as the base magnetic force Mb.

Then, when the magnetic force of the high magnetic force variable magnet 35 becomes substantially the same as the optimum magnetic force value or the base magnetic force Mb, the magnetic force changing control is terminated. Then, as illustrated in FIG. 7, the drive motor 3 is controlled by the normal vector control (step S8 to S10).

Due to the magnetization changing control, the power factor is improved, and the high magnetic force variable magnet 35 can have the magnetic force suited for the rotary power to be output. Thus, even the lightweight and compact drive motor 3 can stably be driven in the wide output range. As a result, weight of the automobile 1 can be reduced, and thus the fuel economy can also be improved. The generated electric power can also be increased, and thus the fuel economy can further be improved. Therefore, this motor control system is suitable for the movable object such as the automobile 1.

Note that the motor control system according to the disclosed technique is not limited to the above-described embodiment and includes various configurations other than that described therein.

For example, as the specific example of the movable object, the automobile 1 (the hybrid vehicle) is exemplified in the above-described embodiment. However, the disclosed technique can be applied to various types of the movable objects. The movable object may be the automobile, an electric vehicle that only uses the motor for travel, a two-wheeled vehicle such as a motorcycle or an electric bicycle, a stand-up scooter, or the like.

The movable object may be a watercraft, a self-propelled train, an aircraft, or the like. The movable object is not limited to a type that a person rides and operates but may be an unattended type that is maneuvered wirelessly. In summary, the disclosed technique can be applied as long as the disclosed technique is mounted on the movable object that moves by using the motor.

The configuration of and the arrangement in the automobile 1, the output range of the drive motor 3, the magnetization regions, and the like described in the embodiment are illustrative. These can be changed according to the specifications.

DESCRIPTION OF REFERENCE SIGNS AND NUMERALS

1: Automobile (movable object)
2: Engine
3: Drive motor
5: First clutch
6: Inverter
7: Second clutch
8: Transmission
10: Battery
21: Motor control unit (control unit)
21a: Motor output control section
21b: Magnetization control section
32: Shaft
33: Rotor
34: Stator
35: Magnet (magnetic force variable magnet)
36: Coil
50: Engine speed sensor
51: Motor rotation sensor
52: Current sensor
53: Magnetic force sensor
54: Accelerator sensor (output sensor)

The invention claimed is:

1. A motor control system configured to be mounted to a movable object that moves by using a drive motor, the motor control system comprising:
   a sensor configured to detect an output requested to drive the movable object;
   a battery configured to supply electric power to the drive motor;
   circuitry configured to control the drive motor such that a requested amount of rotary power of the drive motor is output in a specified output range, the requested amount of the rotary power of the drive motor being set based on a detection value of the sensor;
   a rotor configured to output the rotary power and in which a magnetic force variable magnet is installed; and
   a stator which opposes the rotor with a gap being interposed therebetween and in which plural coils energized by the battery are installed.

2. The motor control system of claim 1, wherein the circuitry is configured to:
   control a drive current flowing through the plurality of coils to cause the requested amount of the rotary power to be output; and
   control a magnetizing current flowing through the plurality of coils to change a magnetic force of the magnetic force variable magnet.

3. The motor control system of claim 2, wherein
   the circuitry is configured to change the magnetic force of the magnetic force variable magnet such that the magnetic force of the magnetic force variable magnet substantially matches an electromagnetic force that is generated in the plurality of coils by the drive current.

4. The motor control system of claim 3, wherein
   a base magnetic force that serves as a reference of the magnetic force variable magnet is set to a magnetic force that substantially matches an electromagnetic force generated in an upper limit load region of an output range.

5. The motor control system of claim 1, wherein
   in a case that the requested amount of the rotary power becomes equal to or lower than a specified value that does not contribute to movement of the movable object, the circuitry is configured to reset the magnetic force of the magnetic force variable magnet to a base magnetic force.

6. The motor control system according to claim 1, wherein
   the output range is divided into plural magnetization regions, and
   the circuitry is configured to change the magnetic force of the magnetic force variable magnet according to each of the plural magnetization regions.

7. The motor control system of claim 1, wherein
   the movable object is an automobile.

8. The motor control system of claim 7, wherein
   the sensor is an accelerator sensor configured to detect an accelerator pedal position.

9. The motor control system of claim 8; wherein
   the automobile further includes an engine,
   the drive motor and the engine are configured to drive the automobile in cooperation with each other on the basis of a detection value of the accelerator sensor, and
   a rated voltage of the battery is equal to or lower than 50 V.

10. A motor control system configured to be mounted to a movable object that moves by using a drive motor, the motor control system comprising:
   a sensor configured to detect an output that is requested to drive the movable object;
   a battery configured to supply electric power to the drive motor; and
   circuitry configured to control the drive motor such that a requested amount of rotary power of the drive motor is output in a specified output range, the requested amount of the rotary power of the drive motor being set based on a detection value of the sensor; wherein
   the drive motor includes
   a rotor configured to output the rotary power and in which a magnetic force variable magnet is installed; and
   a stator that opposes the rotor with a gap being interposed therebetween and in which a plurality of coils energized by the battery are installed, and the circuitry is configured to
- control a drive current flowing through the plurality of coils to cause the requested amount of the rotary power to be output;
- control a magnetizing current flowing through the plurality of coils to change a magnetic force of the magnetic force variable magnet; and
- output the magnetizing current which is a pulsed current that generates a higher electromagnetic force than a coercive force of the magnetic force variable magnet such that the magnetic force of the magnetic force variable magnet substantially matches an electromagnetic force that is generated in the plurality of coils by the drive current.

11. The motor control system of claim 10, wherein
a base magnetic force that serves as a reference of the magnetic force variable magnet is set to a magnetic force that substantially matches a electromagnetic force generated in an upper limit load region of an output range.

12. The motor control system according to claim 10, wherein
the output range is divided into plural magnetization regions, and
the circuitry is configured to change the magnetic force of the magnetic force variable magnet according to each of the plural magnetization regions.

13. The motor control system of claim 10, wherein the movable object is an automobile.

14. The motor control system of claim 13, wherein the sensor is an accelerator sensor configured to detect an accelerator pedal position.

15. The motor control system of claim 14, wherein
the automobile further includes an engine,
the drive motor and the engine are configured to drive the automobile in cooperation with each other based on a detection value of the accelerator sensor, and
a rated voltage of the battery is equal to or lower than 50 V.

16. A motor control system configured to be mounted to a movable object that moves by using a drive motor, the motor control system comprising:
- means for detecting an output requested to drive the movable object;
- means for supplying electric power to the drive motor; and
- means for controlling the drive motor such that a requested amount of rotary power of the drive motor is output in a specified output range, the requested amount of the rotary power of the drive motor being set based on a detection value of the means for detecting; and
- a rotor configured to output the rotary power and in which a magnetic force variable magnet is installed; and
- a stator opposes the rotor with a gap being interposed therebetween and in which plural coils energized by the means for supplying electric power are installed.

17. The motor control system of claim 16, further comprising:
- means for controlling a drive current flowing through the plurality of coils to cause the requested amount of the rotary power to be output; and
- control a magnetizing current flowing through the plurality of coils to change a magnetic force of the magnetic force variable magnet.

18. The motor control system of claim 17, wherein
the circuitry is configured to change the magnetic force of the magnetic force variable magnet such that the magnetic force of the magnetic force variable magnet substantially matches an electromagnetic force that is generated in the plurality of coils by the drive current.

* * * * *